May 5, 1931.  L. T. MEDHOLDT  1,803,973
FEED MECHANISM
Filed Sept. 21, 1928   2 Sheets-Sheet 1

Inventor:
Louis T. Medholdt,
By Ginsohl Ponder Carlson Attys.

May 5, 1931.  L. T. MEDHOLDT  1,803,973
FEED MECHANISM
Filed Sept. 21, 1928    2 Sheets-Sheet 2
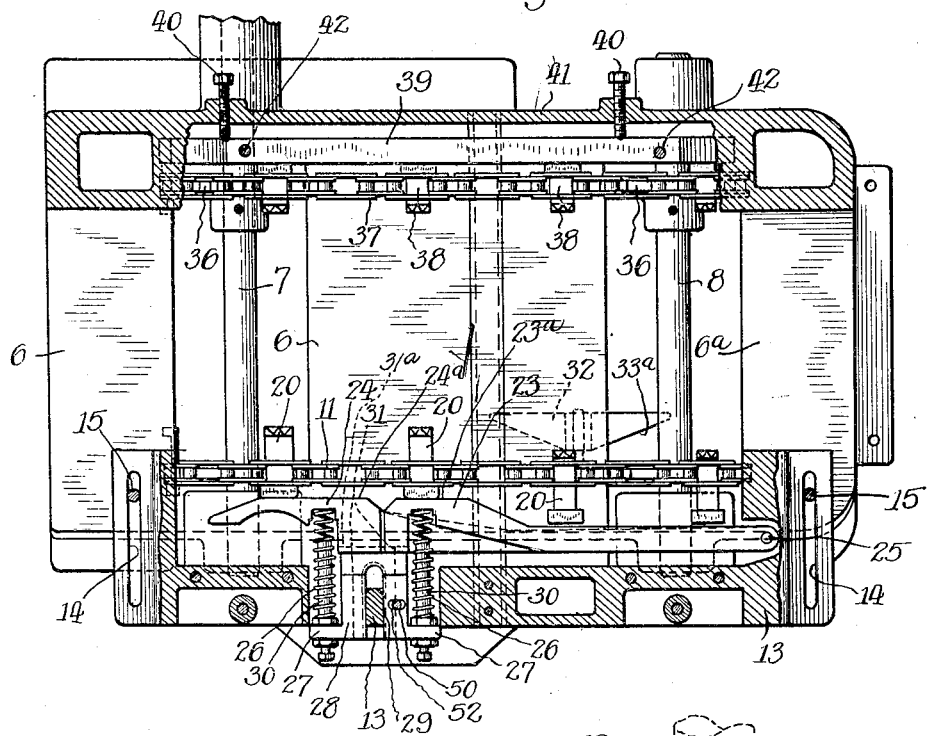
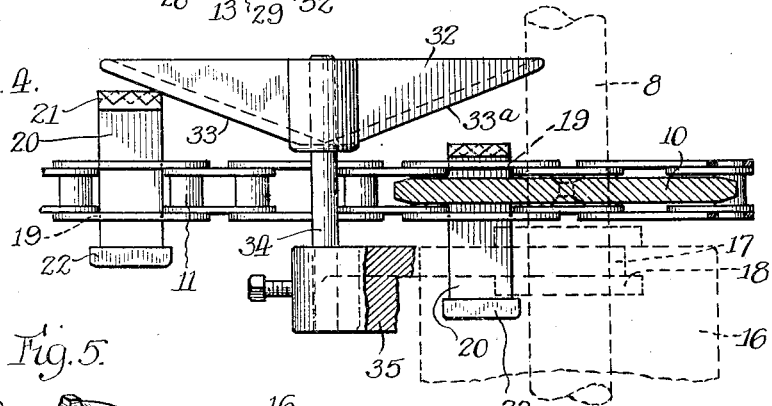
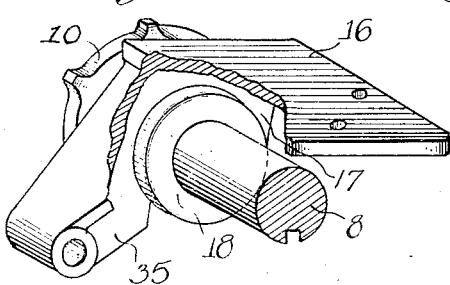
Inventor:
Louis T. Medholdt, Patented May 5, 1931

1,803,973

UNITED STATES PATENT OFFICE

LOUIS T. MEDHOLDT, OF ROCKFORD, ILLINOIS, ASSIGNOR TO MATTISON MACHINE WORKS, OF ROCKFORD, ILLINOIS, A CORPORATION OF ILLINOIS

FEED MECHANISM

Application filed September 21, 1928. Serial No. 307,544.

The invention relates generally to feeding mechanisms and in particular to mechanisms of the type in which articles are fed one by one from a supply into a machine, such as a molding machine or the like, for operation thereon.

The object of the invention resides in the provision of a new and improved feeding mechanism capable of supplying articles to a machine singly in unbroken sequence.

Another object of the invention is to provide an improved mechanism of this character embodying a series of constantly progressing elements movable, as each passes a predetermined point, into abutting engagement with one of a supply of articles, which engagement is maintained to feed the article into a machine for operating thereon.

The invention further embodies the provision of means for ready adjustment to enable the device to operate upon articles of various widths and thicknesses; for self-adjustment to accommodate articles whose width may vary considerably from the average width; and for manually controlling the feeding operation.

Other objects and advantages will become apparent in the following description and from the accompanying drawings, in which:

Fig. 3 is a plan view similar to Fig. 1; with the top portion of the device broken away.

Figs. 4 and 5 are detail views, on an enlarged scale, of parts of the machine.

Figure 1:
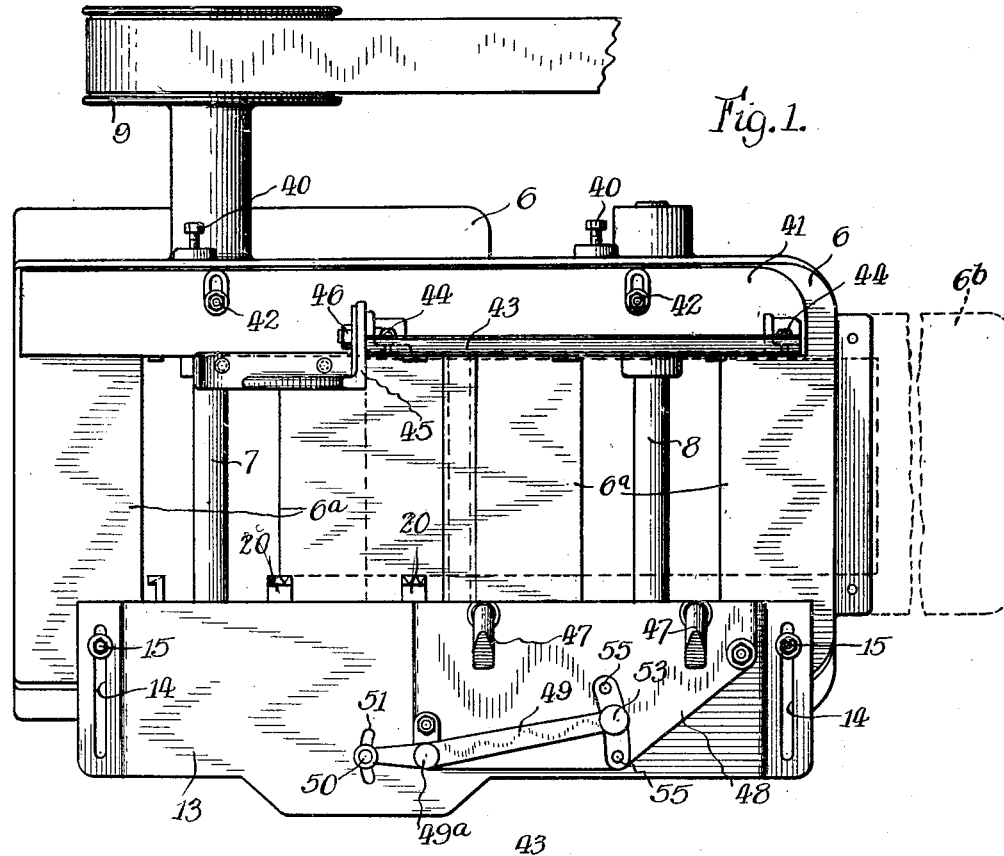
Figure 1 is a plan view of the preferred form of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The embodiment of the invention herein disclosed is designed to feed boards or strips of lumber into a molding machine which shapes said boards. In attaining the objects of the invention, a magazine is provided to receive a supply of boards or articles to be worked upon, and is adjustable to vary the width to accommodate articles of different average widths. The term "average width" as used herein indicates the width of the article which the mechanism is adjusted to receive, which width, due to the adaptability of the mechanism, may vary considerably without hindering efficient operation. The articles are fed singly from the bottom of a supply stack by a constantly moving feeding element which includes a plurality of engaging members. These members are cam actuated, at opportune points, to move into engagement with the lowermost article in the stack and slide the article out of the feeding device into engagement with the machine which operates thereon. The cam members are so disposed that one of the engaging members is moved into the magazine substantially at the time a previous member carries an article therefrom and are yieldably mounted to permit self-adjustment to accommodate articles of widths varying from average. Manual adjustments are provided to adapt the machine for operation upon articles of any size, and manual control means permits an operator to start and stop the feeding movement at will.

More particularly described, the preferred form of feed mechanism illustrated herein comprises a rigid frame 6 which is capable of being mounted upon the feed end of a machine. Journalled transversely of the frame are a pair of longitudinally spaced shafts 7, 8 one of which, in this instance the shaft 7, has an end extending beyond the side of the frame to carry a pulley 9 arranged for connection with a suitable source of power (not shown). The sides of the frame define roughly a channel therebetween which constitutes the lower portion of the magazine for holding a supply of articles A, shown herein as pieces of lumber, the bottom of the channel being designated by a number of flat cross pieces $6^a$ formed integrally with the frame. If desired, the length of the frame may be increased by providing a suitable readily attachable table 6ᵇ indicated in broken outline in Figs. 1 and 2.

The feeding movement of the articles from the magazine is attained in this embodiment by providing, along the lower portion of one side of the magazine, a feeding member which moves longitudinally of the magazine and, at predetermined points in its movement engages the lowermost article therein to carry it out of the magazine. To this end, each shaft 7, 8 carries a sprocket 10 about which a feed chain 11 passes. The sprockets are mounted for rotational and longitudinal sliding movement on the shafts in any suitable manner, as by the splines 12, for the purpose of adjustment as will appear later. A feed plate 13 mounted on the frame immediately above the sprockets and chain has the inner edge thereof extending inwardly of the magazine a short distance beyond the edge of the chain. Adjustment of the plate relative to the frame for movement inwardly or outwardly of the magazine may be readily effected by means of the elongated transverse slots 14 engaged by bolts 15 on the frame.

Means is provided for maintaining the sprockets 10 in definite relationship with the feed plate 13 and, as illustrated in Figs. 4 and 5, a preferred form comprises a bracket 16 for each of the sprockets secured to the plate and having a depending portion 17 recessed to provide a yoke engageable in an annular groove in the hub 18 of the sprockets 10. Thus, the sprockets are held at all times in alinement and movement of the plate carries the sprockets with it along their respective shafts.

The feed chain 11 is arranged to carry means which are capable of projecting laterally into the magazine to engage an article therein or which may occupy a position retracted therefrom. In the present instance, the links of the feed chain are of sufficient width and breadth to permit alined apertures 19 to be formed therein between the pivotal points. At spaced intervals throughout the length of the chain, certain of these links have laterally projecting members, in the form of lugs 20, slidably mounted for relatively free sliding movement in the alined apertures. The end of the lug facing the magazine may be suitably knurled, as at 21, or otherwise roughened to insure a secure engagement with the articles and the other end carries an enlarged head 22 preferably formed with a flat outer surface. The length of the lugs is such that the lugs project a substantial distance into the magazine when the heads thereon are in abutment with the chain.

Preferably a cam surface is employed to move the lugs into projecting position since such a means produces a positive movement of the lugs and a firm engagement thereof with the article. The lower side of the feed plate 13 carries a pair of cam members 23, 24 (Fig. 3), having cam surfaces 23ᵃ, 24ᵃ thereon which are alined and are positioned adjacent the upper or forwardly moving portion of the chain on the side thereof remote from the magazine. For purposes of adjustment, as will appear later, the cam members are substantially elongated and are pivoted to the plate, as at 25, at one end thereof. The preferred disposition of the two cam surfaces is such that one cam, in this instance the cam 23, is arranged to engage the flat heads 22 on the lugs at a point near the discharge end of the magazine while the other cam 24 engages the lugs to maintain the feeding engagement thereof after the article has been moved out of the magazine by the first mentioned cam 23.

Such an arrangement, it is obvious, permits the cam in the magazine to adjust itself to the lesser or greater width of a succeeding article as soon as the preceeding article has moved from the magazine, thus insuring that each article in the stack will be engaged and ejected immediately after the article becomes the bottom one in the stack.

Suitable means are provided which serve yieldably to urge the cams toward the magazine, which means further permits of slight adjustment to meet an unusual temporary variation in the width of the articles and also provides a stop control for the mechanism. As illustrated herein (Fig. 3) the rear faces of the cams 23, 24 are formed to provide seats for one end of a pair of helically coiled springs 26. The other ends of the springs bear upon flanges 27 projecting from either side of a cross slide 28 slidably mounted upon the lower face of the plate 13, as by means of the ways 29 which extend transversely of the plate toward the magazine. Spring guides 30 in the form of pins project from the flanges 27 and are adjustable, in the usual manner, to vary the tension of the springs.

Stop members are provided to limit the extent of the inward movement of the cams which are preferably associated with the cross slide so that movement of the cross slide adjusts the limited position of the cams. Thus, the cam members 23, 24 overlie the inner end of the cross slide and the abutting surfaces are cut away to provide projecting interengaging flanges 31, 31ᵃ upon the cams and slide respectively which limit the movement of the cams in the direction of the magazine. By this construction it will be apparent that the feeding lugs will be held in positive engagement with the article by the cams, yet are permitted to yield by the springs should any of the articles be of greater width than the average. Moreover by moving the slide inwardly toward the magazine, the limit of the cams also move to increase the extent which the lugs project into the magazine. Contrarily, a movement of the slide away from the magazine also carries the cams outwardly to prevent a feeding engagement of the lugs with the articles.

In completing the cycle of movement of the feeding lugs by returning the lugs to their original retracted position, another cam member is preferably employed. A suitable cam for this purpose is shown at 32 (Fig. 4) as comprising a flat plate having front and rear cam surfaces 33 positioned adjacent the lower or rearwardly moving portion of the feed chain. The cam is arranged for movement with the feed plate 13 to preserve the desired position relative to the chain and for this purpose a rod 34, mounted on the plate, is adjustably supported in a transverse bore in an arm 35 which may be formed as an integral part of the depending portion 17 of the bracket 16 on the shaft 8 (see Fig. 5). Thus, as the chain moves past the cam 32, the knurled face on the lugs 20 engage the cam surface 33 and move the lugs to their retracted position. The rear cam surface 33$^a$ is not essential but is provided in case the operator desires, for any reason, to reverse the feed mechanism.

While the opposite side of the magazine may comprise merely a stationary guide member, it is desirable to lessen frictional resistance to the movement of the articles by providing a positive driving means thereon. In the present embodiment this means comprises a second pair of sprockets 36 which may be mounted in alined relation on the shafts 7 and 8 in a manner similar to the mounting of the sprockets 10. A feeding chain 37 corresponding to the chain 11, connects the sprockets and carries a plurality of spaced lugs 38 similar to but shorter than the lugs 20. The lugs 38 are, however, fixed permanently in relation to the links of the chain 37 in any suitable manner and the rear face of the lugs are arranged for sliding abutment against an elongated fixed guide 39 to prevent displacement of the chain laterally from the magazine. Set screws 40 in the frame may be employed to adjust and maintain the position of the guide relative to the chain. The guide is carried by a guide plate 41 (Fig. 1) which is mounted for limited adjustment as by the bolt and slot connections 42 on the frame adjacent the side of the magazine opposite the plate 13. Preferably the relation of the plate 41 to the chain 37 is such that the lugs 38 project only a short distance beyond the inner edge of the plate. In this manner a laterally rigid guide is provided which has a positive feeding engagement with an article when the article is engaged by the cam projected lugs 20 on the opposite side of the magazine.

Figure 2:
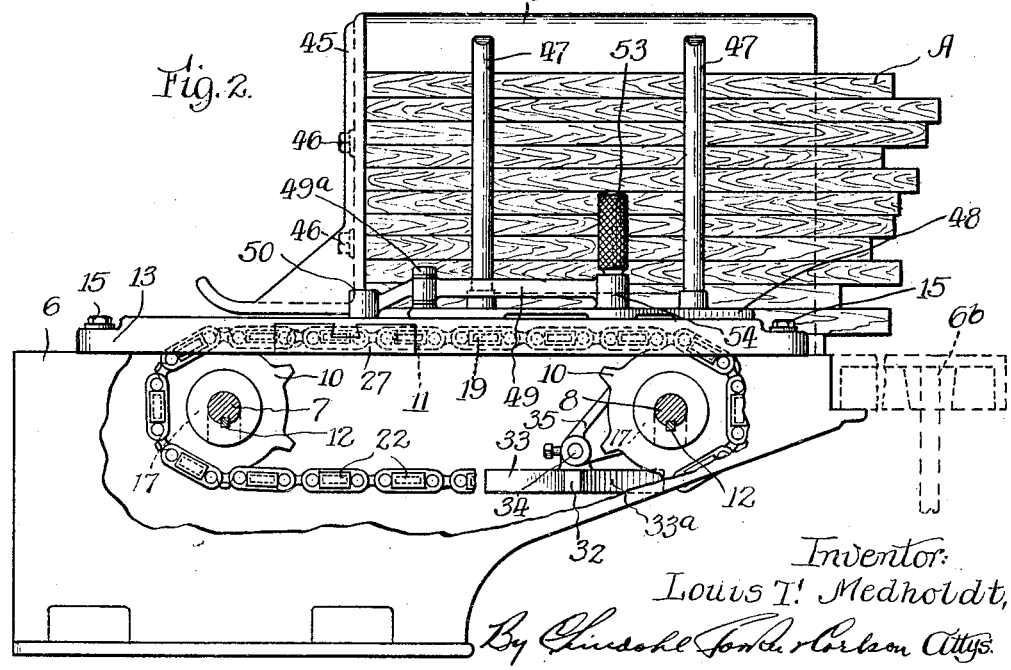
Fig. 2 is a side elevation, parts being broken away to disclose the interior.

Since in the operation of the machine, a stacked series of articles are placed in the magazine, provision is made for supporting the sides of the stack which may also be adjustable to prevent the removal of more than a single article at any one time. Referring to Figs. 1 and 2, an upright wall 43 is detachably secured by the bolts 44 to the guide plate 41 adjacent the inner edge thereof. At its forward end, the wall 43 supports a second wall 45 which is substantially perpendicular thereto and extends a substantial distance into the magazine to form an abutment determining the forward position of the articles in the magazine. The wall 45 is vertically adjustable, as by bolt and slot connections 46 with the wall 43 to permit the lower edge of the wall 45 to be spaced at varying distances from the bottom of the magazine. In this manner a clearance may be obtained which is ample to permit free movement of the bottom article from the stack but which engages the remaining articles to hold them in place.

Suitable supporting means are also provided on the opposite side of the magazine which comprises, in this instance, a pair of upright members 47, in the form of rods, which are rigidly mounted in spaced longitudinal relation near the inner edge of an auxiliary plate 48 detachably mounted on the feed plate 13. The upright members on each side of the magazine, it will be seen, amplify the holding capacity of the magazine and at the same time permit ready access to the articles therein from the rear and from one side. Moreover these members may be easily removed from the feed and guide plates 13 and 41 when the feeding mechanism is not used in connection with the operation of the machine.

The auxiliary plate 48 also carries the means for manually moving the slide 28 to its positions of adjustment and feed control. To this end, a lever arm 49 (Figs. 1 and 2) is pivotally mounted, as at 49$^a$, at an appropriate point on the plate 48, with one end of the arm overlying the plate 13 and the slide 28 mounted therein. This end of the lever carries a depending pin 50 which extends through a slightly arcuate slot 51 in the plate 13 into engagement with an appropriately formed aperture 52 (Fig. 3) in the slide 28. An operating handle 53 is slidably mounted for vertical movement in a vertical bearing 54 at the other end of the lever 49, and spaced recesses 55 (Fig. 1) in the plate 48 are arranged to receive the inner end of the handle 53 to hold the lever in position.

Considering the operation of the feeding mechanism it is presumed that the frame is properly mounted on the machine and that the drive for the feeding mechanism is operating at a slightly faster rate of speed than the feeding rolls on the machine. The guide plate 41 and chain 37 have also been adjusted to direct the articles properly toward the machine, as has the vertical wall 45 to form an opening of required size at the bottom of the magazine. The average width of the articles having been determined the feed plate is adjusted to a corresponding position for that width, at which position the projected lugs 20 engage theoretically the articles about midway between their fully extended and fully retracted positions.

When a stack of articles is placed in the magazine the control handle is in its stop position, in which the slide 28 and cam members 23, 24 are retracted. To start the feeding operation the handle is moved to slide the cam surfaces 23, 24 forward into operative position for engagement by the lug heads 22, thereby effecting a successive projection of the lugs into engagement with the bottom article in the stack. This clamps the article between the lugs on the oppositely disposed feed and guide chains to carry the article forwardly out of the magazine.

The position of the first cam 23 is such that the lugs first engage the article near the forward end of the magazine which engagement is positively maintained until the lug has moved to a position substantially on a line with the end of the magazine. Shortly thereafter the second cam 24 engages the lug to complete the feeding movement, after which the lug moves into contact with the retracting cam surface 33.

The spaced relation of the lugs longitudinally of the chain is such that after one lug has passed beyond the forward end of the magazine, there will be a brief instant in which the magazine is free of lugs before the succeeding lug moves inwardly. This permits the next succeeding article in the stack to fall into position as soon as the bottom article has been moved therefrom. Thus the articles are withdrawn continuously from the stack. Inasmuch as the feed chains are driven at a slightly higher speed than the main feed rolls of the machine the short gap between successive articles will be closed and the articles fed to the machine in a substantially unbroken sequence. Should the feed mechanism operate too rapidly the lugs may slide along the side faces of the articles until the feeding movement may be resumed.

I claim as my invention:

1. A feed mechanism comprising, in combination, a magazine to receive a stack of articles, feed means including a plurality of members projectable into the lower portion of said magazine into feeding engagement with the side face of the lowermost of said articles, and means engaging said members successively at a predetermined point to project said members into said magazine and into engagement with the side of the article.

2. A feed mechanism comprising, in combination, a magazine to receive a pile of articles including means to prevent the movement of any but the lowermost article therefrom in a feeding direction, and feeding means for discharging the lower one of said articles from said magazine, said means having a successive projection into said magazine at a point intermediate the ends of the article therein and subsequent passage through said magazine from such a point.

3. A feed mechanism comprising, in combination, a magazine to receive a stack of articles, and a series of members including actuating means therefor having successive projection into and progressive passage through one side of the magazine.

4. A feed mechanism comprising, in combination, a magazine adapted to hold a stack of articles, and a plurality of article-engaging members moving in the line of feed at one side of the magazine and having successive cam-actuated projection into engagement with the side face of an article in said magazine.

5. A feed mechanism comprising, in combination, a magazine adapted to hold a supply of articles, feed means progressing in the line of feed adjacent said magazine and capable of lateral projection into engagement with the side face of an article in the supply, and means for effecting such projection positioned for engagement by said feed means during the movement thereof.

6. A feed mechanism comprising, in combination, a magazine adapted to hold a supply of articles, feed means progressing in the line of feed adjacent said magazine and capable of lateral projection into engagement with an article in the magazine, means for effecting such projection positioned for engagement by said feed means during the movement thereof past the side of said magazine, and means for returning said feed means to its original position after the engaged article has moved from the magazine.

7. A feed mechanism comprising, in combination with a magazine adapted to hold a stack of articles, a plurality of article-engaging members moving in the line of feed at one side of the magazine and having cam-actuated projection from a normal traveling position into engagement with the side face of an article in said magazine, and cam means for returning said members to said normal position.

8. A feed mechanism comprising, in combination with a magazine adapted to hold a stack of articles, an endless feeding device moving in the line of feed at one side of the magazine, a series of article engaging members carried by said device, each of said members being capable of lateral movement into feeding engagement with the side face of the lowermost article in said stack, cam means engaging said members to effect said engaging movement, and other cam means engaging said members to effect a movement thereof in the opposite direction.

9. A feed mechanism comprising, in combination with a magazine to receive a stack of articles, feed means including a plurality of spaced members moving in the line of feed, and means operating upon said members to effect a successive projection thereof into the magazine at a predetermined point intermediate the ends of said magazine.

10. A feed mechanism comprising, in combination with a magazine adapted to receive a pile of articles, feed means including a plurality of transversely movable members traveling in the line of feed, and means for moving said members into engagement with the lowermost article in said magazine including a cam engageable by said members during the travel thereof past said magazine.

11. A feed mechanism comprising, in combination with a magazine adapted to receive a pile of articles, feed means including a plurality of transversely movable members traveling in the line of feed, and means for effecting an operative engagement of said members with the lowermost of said articles in said magazine including a pair of cams engageable by said members during the travel thereof, one of said cams being positioned to move the members into engagement with the articles and the other to maintain the engagement after the article has moved from the magazine.

12. A feed mechanism comprising, in combination, a magazine adapted to receive a pile of articles, feed means including a plurality of transversely movable members traveling in the line of feed, and means for moving said members into engagement with the side face of the lowermost article in said magazine including a cam member positioned normally to move said feed members inwardly of said magazine to engage articles of a certain width, said cam member being yieldably mounted to permit movement away from said magazine when an article of greater width is engaged.

13. A feed mechanism comprising, in combination, a magazine adapted to receive a pile of articles, feed means including a plurality of transversely movable members traveling in the line of feed, and means for moving said members into engagement with the side face of the lowermost article in said magazine including a movable cam member arranged to engage said feed members to effect a movement thereof into said magazine, means limiting the inward position of said cam member, and means normally urging said cam member against said limiting means.

14. A feed mechanism comprising, in combination, a magazine adapted to receive a pile of articles, feed means including a plurality of transversely movable members traveling in the line of feed, and means for moving said feed members into and maintaining them in operative engagement with an article, including a pair of cams normally positioned to engage and move said feed members inwardly a predetermined distance for articles of a certain width, and means yieldably permitting movement of said cams away from the magazine when an article of greater width is engaged by the feed members.

15. A feed mechanism comprising, in combination, a magazine arranged to receive a stack of articles, feed means for moving said articles from said magazine including feed members traveling in the line of feed and movable into engagement with an article in said magazine, cam means for effecting such movement positioned to be engaged by said members in the travel thereof, and means for adjusting the position of said cam means transversely of the direction of the line of feed.

16. A feed mechanism comprising, in combination, a magazine arranged to receive a stack of articles, feed means for moving said articles from said magazine including feed members traveling in the line of feed and movable into engagement with an article in said magazine, and means for effecting such movement comprising a member movable transversely of the line of feed having a cam surface thereon engageable by said feed members during the travel thereof, means limiting the inward position of said member relative to said magazine, and means yieldably resisting movement of said member in the opposite direction, said limiting and resisting means being adjustable to vary the position of the cam surface according to the average width of the articles to be fed.

17. A feed mechanism comprising, in combination, a magazine arranged to receive a stack of articles, feed means for moving said articles from said magazine including feed members traveling in the line of feed and movable into engagement with an article in said magazine, and means for effecting such movement comprising a member movable transversely of the line of feed having a cam surface thereon engageable by said feed members during the travel thereof, means limiting the inward position of said member relative to said magazine, means yieldably resisting movement of said member in the opposite direction, and means operatively connected to said member for moving said cam surface out of the path of travel of said means.

18. A feed mechanism comprising, in combination, a magazine arranged to receive a stack of articles, feed means for moving said articles from said magazine including feed members traveling in the line of feed and movable into engagement with an article in said magazine, a frame adjacent one side of said magazine, cam means for actuating said feed members mounted on said frame for movement into and out of the path of said feed members, and means for effecting the movement of said cam means comprising a plate slidable in said frame toward and from said magazine, means for moving said plate, resilient means interposed between said frame and said cam means normally urging said cam means toward said magazine, and means forming an interengagement between said plate and cam means to limit the urged movement of said cam means.

19. A feed mechanism comprising, in combination, a magazine adapted to hold a stack of articles, a feed chain moving along the side of said magazine, a plurality of laterally movable members carried in spaced relation by said chain, and means operating upon said members at a predetermined point in the travel thereof past said magazine to effect such lateral movement into the magazine.

20. A feed mechanism comprising, in combination, a magazine to receive a stack of articles, a pair of substantially parallel shafts underlying and extending transversely of said magazine, driving means for one of said shafts, two sets of sprockets on said shafts alined longitudinally on each side of said magazine, two feed chains each running over one set of sprockets and positioned with the upper run of each chain extending adjacent longitudinally opposite sides of said magazine, article-engaging members carried by said chains and means for effecting projection of certain of said members into said magazine to engage the side of an article therein and bind said article in feeding relation between opposite members on said chains.

21. A feed mechanism, comprising, in combination, a magazine to receive a stack of articles, a driven feed chain having a substantial portion thereof extending along one side of the lower portion of said magazine, a second driven chain disposed in similar relationship to the magazine on the opposite side therof, and means on one of said chains movable into said magazine to engage the side of an article therein to bind said article between said chains for movement therewith.

22. A feed mechanism, comprising, in combination, a magazine to receive a stack of articles, a driven feed chain having a substantial portion thereof extending along one side of the lower portion of said magazine, a second driven chain disposed in similar relationship to the magazine on the opposite side thereof, and means on one of said chains movable into said magazine to engage the side of an article therein to bind said article between said chains for movement therewith, and means for preventing lateral movement of said feeding means away from said article.

23. A feed mechanism, comprising, in combination, a magazine to receive a stack of articles, a driven feed chain having a substantial portion thereof extending along one side of the lower portion of said magazine, a second driven chain disposed in similar relationship to the magazine on the opposite side thereof, means on one of said chains movable into said magazine to engage the side of an article therein to bind said article between said chains for movement therewith, and means for maintaining the binding action after said article has moved from said magazine.

24. In a device of the character described, a magazine adapted to receive a supply of articles, means in the line of feed along one side of the magazine adapted to engage and eject an article from the magazine, and guide means also traveling in the line of feed on the opposite side of the magazine from the ejecting means arranged to hold the engaged article against displacement transversely of the line of feed.

25. In a device of the character described, a magazine adapted to receive a supply of articles, feeding means arranged to engage and move an article from the magazine and means for guiding the engaged article during the movement thereof from the magazine, said means being capable of movement in the line of feed and rigid against movement transversely thereto.

26. A feed mechanism comprising, in combination, a magazine adapted to hold a stack of articles, feed means including a plurality of laterally projectable members moving in the line of feed along the side of the magazine, and means operating at a predetermined point in the movement of said members to project said members into engagement with an article in the magazine, said members being spaced apart in the line of feed a distance sufficient to permit a projected member to move from said magazine prior to the projection of the next succeeding member.

27. A feed mechanism, comprising in combination, a magazine adapted to hold a stack of articles, feed members moving in the line of feed along the side of the magazine and movable laterally into engagement with the side face of an article in the magazine, means including a cam surface arranged to engage said members at a predetermined point in the magazine to effect said lateral movement, and a second means having a second cam surface engageable by said members after the article has been moved from the magazine.

28. A feed mechanism comprising, in combination, a magazine adapted to hold a stack of articles, feed members moving in the line of feed along the side of the magazine and movable laterally into engagement with an article in the magazine, and a series of three spaced cam members positioned for operative engagement with said feed members in the movement thereof, the first of said cams having a surface for effecting the projection of said feed members in to said magazine, the second of said cams having a surface for maintaining the feed members in projected position after the members have moved from the magazine, and the third one of said cams having a reversed surface for restoring the feed members to the original position.

29. A feed mechanism comprising, in combination, means to contain a pile of articles of different widths, and feeding means for removing successive articles therefrom comprising a device travelling along the line of feed and carrying laterally shiftable article-engaging members, and two independently operable instrumentalities for holding said article engaging members in operative engagement with the articles regardless of variations in widths of the successive articles.

In testimony whereof, I have hereunto affixed my signature.

LOUIS T. MEDHOLDT.